J. ACHBERGER.
NON-SKID DEVICE.
APPLICATION FILED APR. 22, 1918.

1,290,474.

Patented Jan. 7, 1919.

Inventor
J. Achberger

UNITED STATES PATENT OFFICE.

JOZEF ACHBERGER, OF MIDDLETOWN, OHIO.

NON-SKID DEVICE.

1,290,474.

Specification of Letters Patent. Patented Jan. 7, 1919.

Application filed April 22, 1918. Serial No. 230,067.

*To all whom it may concern:*

Be it known that I, JOZEF ACHBERGER, a subject of the King of Hungary, (having declared his intention to become a citizen of the United States of America,) residing at Middletown, in the county of Butler and State of Ohio, have invented certain new and useful Improvements in Non-Skid Devices, of which the following is a specification.

The primary object of the invention is the provision of a non-skid device readily adapted for attachment upon the tread portion of a vehicle wheel for affording greater traction properties when traveling upon the roadbed.

A further object of the invention is to provide a detachable non-skid link for pneumatic tires having a hinged arrangement for compensating for the flexing of the pneumatic tire while transverse bracing portions of the link penetrate the roadbed when the vehicle is traveling thereover.

Figure 1:
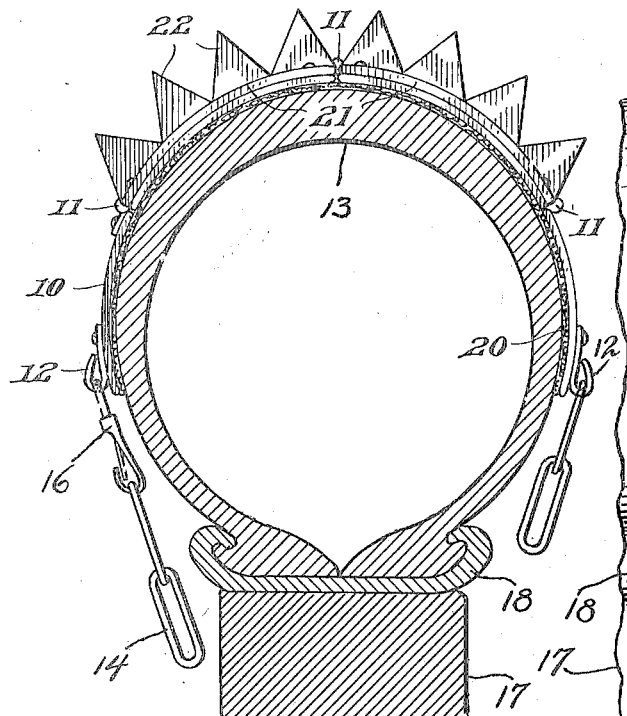
Figure 2:
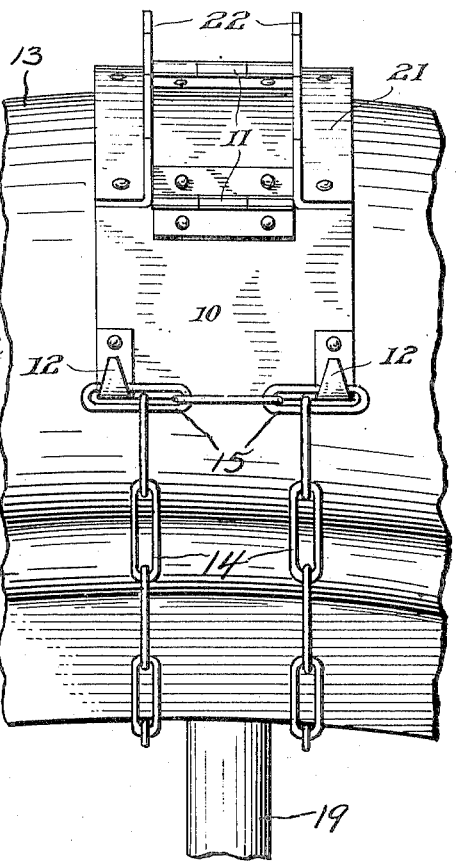
Figure 3:
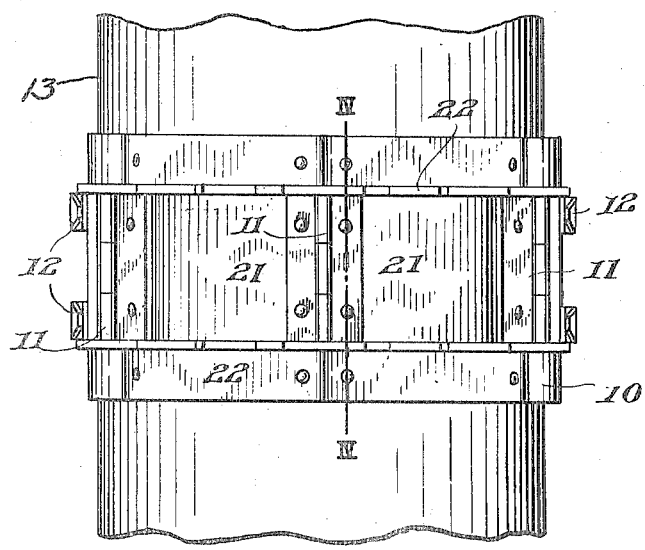
Figure 4:
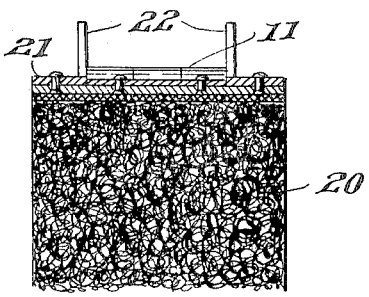

In the drawings forming a part of this application and in which like reference characters refer to corresponding parts throughout the several views, Figure 1 is an elevational view of the device in its operative position with a sectional showing of a portion of a wheel upon which the device is mounted illustrated by dotted lines, Fig. 2 is a side elevation thereof, Fig. 3 is a plan view of the same and Fig. 4 is a transverse sectional view taken through the device upon line IV—IV of Fig. 3.

Referring more in detail to the drawing my device includes four sections 10, each section consisting of an arcuate plate, hinges 11 being provided for connecting the four plates together in flexible link formation while an attaching hook 12 is positioned at each of the four corners of the device.

The hinged plates 10 are readily fitted upon the tread portion of a tire such as 13 to conform to the curvature thereof and the device held in position upon the tire 13 by means of a chain 14 having its links 15 secured to the hooks 12 carried by one end plate 10 of the device and with the free ends of the chain detachably connected by snap fasteners 16 to the hooks 12 carried by the opposite end plate 10 of the device. It will be understood that the chain 14 is positioned against the inner face of the adjacent portion of the felly 17 of the wheel upon which the rim 18 is mounted with the tire 13 carried thereby. By releasing the ends of the chain 14 from the fasteners 16, the device is readily detached from the tire 13 while it will be apparent that the spaced portions of the chain 14 which engage the inner face of the felly 17 may extend upon opposite sides of one of the spokes 19 of the vehicle wheel.

A lining 20 of soft material such as felt is provided for the sections 10 for directly engaging the tire 13 affording better frictional contact therewith as well as protecting the rubber tire 13 from injury by the edges of the plates 12 during the operation of the device.

Curved calk members or plates 21 are marginally secured spaced apart upon each of the longitudinal edges of the plates 10, preferably upon only the two centrally positioned ones of said plates 10. The calk members 21 not only brace the outer edge portions of the intermediate plates 10 but also provide outwardly projecting substantially triangular shaped teeth 22, which are integrally carried by the inner edges of the members 21. In this manner great strength and rigidity is given to the sections 10 which carry the calk members 21 while the teeth 22 are arranged transversely of the tread portion of the tire 13 when my device is operatively positioned upon a wheel. The hinges 11 lie between the rows of teeth 22 and the sections are permitted to move relatively upon the hinges 11 so that the inner periphery of the device may fit a tire of small diameter if desired while the outward swinging movement of the sections 10 is only limited by contacting with the terminal ones of said teeth 22.

The complete operation of the device will be apparent from this detailed description thereof, the same being readily mounted upon the tire 13 in the manner set forth and detachably secured thereon by the chains 14.

During the traveling of the wheel upon the roadbed, the teeth 22 which are arranged in parallel rows transversely of the tread of the wheel will penetrate the roadbed permitting the tire to obtain a better grip upon the road while the hinges 11 permit the device to slightly flex with the relative movement between the sections 10 so that the device may slightly conform to the varying conditions of the roadbed over which the wheel is traveling. The calk members 22 form positioning means for the hinges 11 of the two intermediate sections of the device and marginally strengthen such sections as well as provide the road-engaging teeth 22. It will be seen that the calk members 22 and the hinges 11 arrange a rectangular inclosure in the outer face of each of the two intermediate sections 10 which affords additional traction properties, especially when traveling through sand and soft roads, so that the device will prevent side slipping and skidding as well as assisting in the forward movement of the wheel.

What I claim as new is:—

1. A non-skid device comprising a plurality of arcuate plates, spaced pairs of alined angular calk members transversely secured to said plates adjacent their outer edges with rows of road-engaging teeth spaced inwardly of said edges, and hinges connected to the adjacently positioned portions of said plates between the said teeth forming rectangular depressions in the outer traction surface of the device.

2. A non-skid device comprising four arcuate plates of substantially the same dimensions, hinges secured to said plates inwardly of their edges connected the plates inwardly whereby the device is adapted for snugly fitting upon tires of different diameters, attaching means carried by the outer corners of the terminal ones of said plates, and calk members angular in cross section having acuate plate portions flatly secured to the marginal portions of the two intermediately positioned plates of the device adjacent the end and outwardly of said hinges, the said calk members having outwardly projecting teeth at their inner portions adapted for arrangement transversely of a vehicle tire when the device is operatively positioned thereon.

3. A non-skid device comprising four arcuate plates of substantially the same dimensions, hinges secured to said plates inwardly of their edges connecting the plates together whereby the device is adapted for snugly fitting upon tires of different diameters, attaching means carried by the outer corners of the terminal ones of said plates, and calk members angular in cross section having arcuate plate portions flatly secured to the marginal portions of the two intermediately positioned plates of the device adjacent the ends and outwardly of said hinges, the said calk members having outwardly projecting teeth at their inner portions adapted for arrangement transversely of a vehicle tire when the device is operatively positioned thereon, the said hinges and calk members forming rectangular receiving means upon the tread portion of the device adapted for gripping the roadbed when operatively engaged therewith.

In testimony whereof I affix my signature.

JOZEF ACHBERGER.